United States Patent
Waugh

Patent Number: 5,848,443
Date of Patent: Dec. 15, 1998

[54] PORTABLE AUTOMOBILE URINAL

[76] Inventor: Aston Waugh, 340 N. Arlington Ave., East Orange, N.J. 07017

[21] Appl. No.: 986,528
[22] Filed: Dec. 8, 1997
[51] Int. Cl.⁶ .................................................. B60R 15/04
[52] U.S. Cl. ............................ 4/458; 4/315; 4/321; 4/301
[58] Field of Search .......................... 4/458, 114.1, 315, 4/321, 361, 431, 450, 454, 455, 457

[56] References Cited

U.S. PATENT DOCUMENTS

| | | | |
|---|---|---|---|
| 3,504,381 | 4/1970 | Dewey, II | 4/321 |
| 3,666,103 | 5/1972 | Green | 210/152 |
| 3,740,773 | 6/1973 | Sargemt | 4/114 |
| 3,757,357 | 9/1973 | Smith | 4/458 |
| 4,376,314 | 3/1983 | Iwans | 4/431 |
| 4,712,255 | 12/1987 | Astos et al. | 4/323 |
| 4,747,166 | 5/1988 | Kuntz | 4/455 |
| 4,785,483 | 11/1988 | Wise | 4/32 |
| 5,117,511 | 6/1992 | Smith | 4/114.1 |

FOREIGN PATENT DOCUMENTS

| | | |
|---|---|---|
| 29 8098 | 6/1981 | Denmark . |
| 3040107 | 5/1982 | Denmark . |
| 29607144 | 8/1996 | Denmark . |
| 8228960 | 9/1996 | Japan . |

Primary Examiner—David J. Walczak

[57] ABSTRACT

An automobile urinal having a portable elevated flushing solution container, a portable bowl, (which when in use is positioned in the seat) and a portable disposable collecting bladder. The flushing solution container and the disposable collecting bladder are separately connected to the bowl by valved tubing.

3 Claims, 2 Drawing Sheets

PORTABLE AUTOMOBILE URINAL

FIELD OF THE INVENTION

This invention relates to a vehicular urinal, more specifically to a simplified urinal for an automobile.

BACKGROUND OF THE PRIOR ART

Many motorists and passengers alike find it necessary to relieve themselves of urine when traveling. While some hasten to the nearest available sanitary convenience, others relieve themselves by roadsides.

To solve this problem inventors have created some types of automobile toilets, U.S. Pat. No. 366,103 to Harry W. Green discloses a system that is usable only in vans or bigger passenger vehicles fitted with air scoop. U.S. Pat. No. 4,712,255 to John M. Astos, Ann Arbor, John R. Setina Ypsilanti describes a portable toilet wherein the bowl, waste holding tank and flushing water tank are an integral unit. It also necessitates the use of a pumping mechanism to transfer fresh water to the bowl from a water storage. U.S. Pat. No. 4,785,483 to Paul H. Wise discloses a system that has to be custom built in the automobile and is restricted only to the seat in which it is built. There are also other well known urinal systems used in large, long distance buses, trains and aircrafts. All the toilet systems mentioned in the prior art have to be built in the vehicle and/or too large to be used in the sat of a vehicle. Other systems of the prior art are like that of JP 8228960, DE 29607144, DE 3040107, and DE 294898 are complete toilets and therefore not as handy and convenient though they are designed to be usable in cars, therefore they do not really solve the everyday problem of a quick and simple means for relieving one's self of urine while in a vehicle as small as a car.

OBJECTS AND ADVANTAGES

The object of this invention is to provide automobile users with a simple device to easily, sanitarily and discretely relieve themselves of urine while in a vehicle. Some advantages of this invention are that.

(a) it can be easily fitted to any vehicle;

(b) it can be used on any seat in a vehicle;

(c) there is no need to connect the system to any other in the vehicle and (d) it does not need to be powered.

DESCRIPTION OF THE INVENTION

Figure 1:
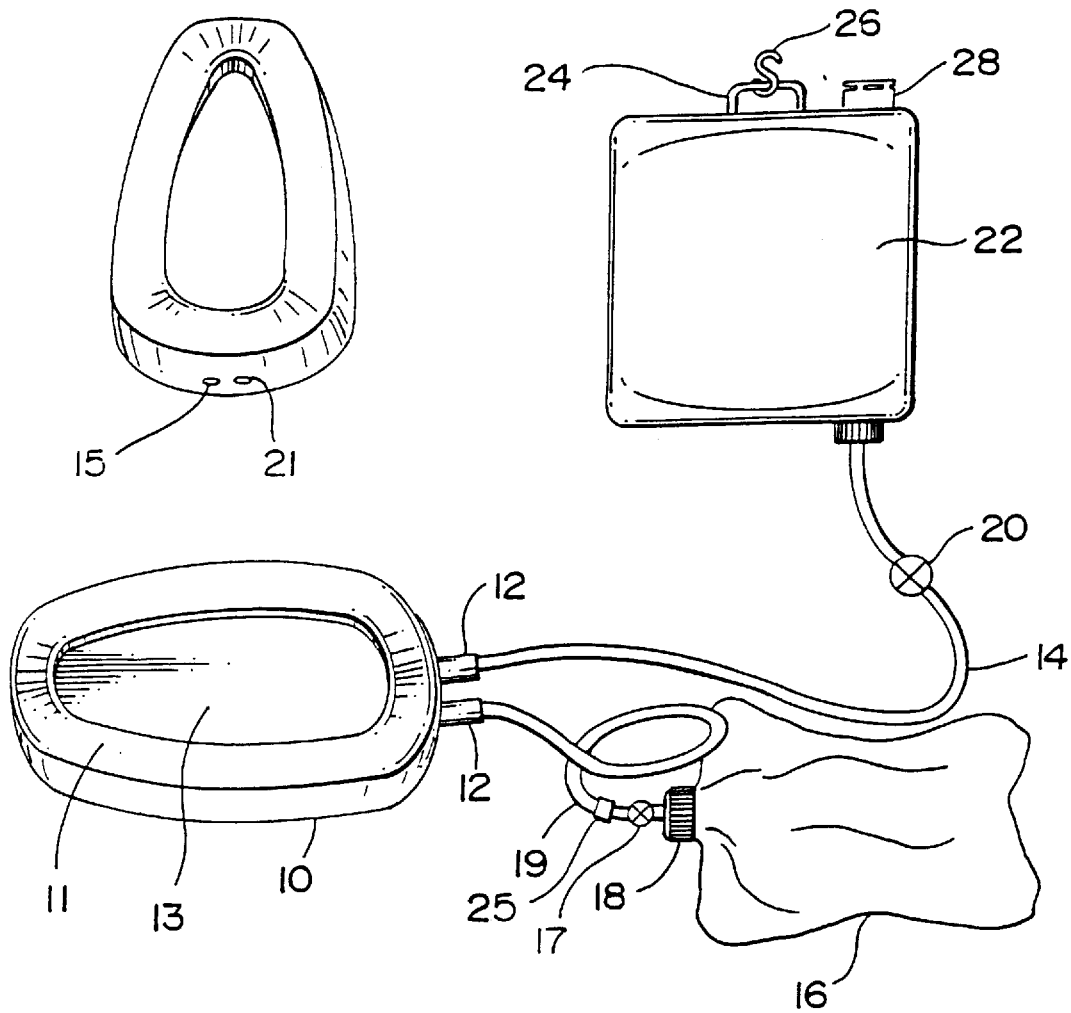
FIG. 1 shows a complete layout of the invention. It consists of a bowl (10) that can be about 2" deep and preferably of an elliptical shape of about 10" in width and about 12" in length. Atop the bowl is a seat (11) preferably having an elliptical opening (13). At one of the extreme ends of the bowl and closest to the bottom is a drain hole (15). The drain hole is fitted with a quick connect coupling (12). Immediately beside the drain hole is an inlet hole (21) in which another quick connect coupling (12) is fitted. Along the inside circumference of the bowl is positioned a flushing solution ejection device (30), (described in the description of FIG. 2). One end of the inlet quick connect coupling is connected to the ejection device while the other end is connected to (preferably flexible) tube (14). Tube (14) is connected to valve (20) (spring loaded for reclosing) which is connected to the flushing solution container (22) by tube similar to (14). On top of the enclosed flushing solution container is a handle (24) and a capped opening (28). On the handle is a hook (26). Connected to the outlet drain coupling of the bowl is a tube (19) that leads to a collecting disposable bladder (16) connected to the bladder by coupling (18). Between the outlet drain coupling (12) and coupling (18) are connector (25) and valve (17).
Figure 2:
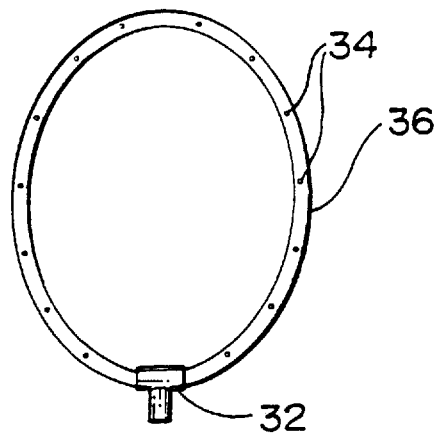
FIG. 2 shows the flushing solution ejecting device (30). The device consists of a tubing (36) bent in the shape of the bowl (10) with each end connected to a "T" coupling (32). The stem of the "T" coupling is connected to the flushing solution inlet quick connect coupling fitted in the bowl. The two ends of the bent tube (36) are connected to the cross piece of the "T" coupling. The bent section is perforated with jet holes (34).
Figure 3:
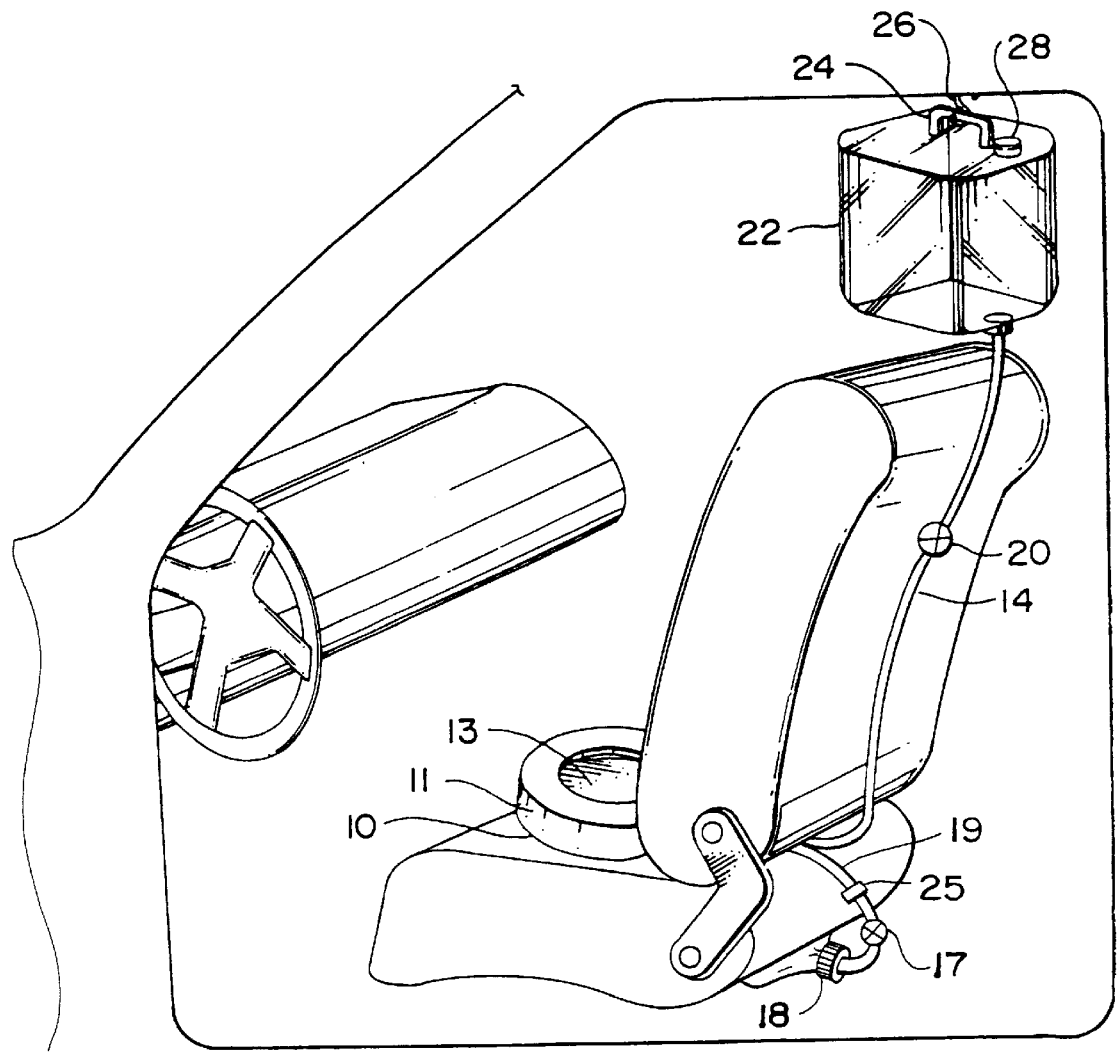
FIG. 3 shows the invention positioned for use.

The filled flushing solution tank (22) with valve (20) closed is positioned inside the vehicle at a point as high as possible from the seat of the vehicle. The bladder (16) is placed under a seat in the vehicle with the tube (19) leading out from the bladder. For example, if the bladder is placed under the front passenger seat in a car, the bladder is positioned such that the coupling on the bladder faces the back passenger seat. The tube (19) leading from the bladder (16) is passed between the seat and the bottom of the back support. The flushing solution tank is hung onto the back passenger overhead arm support by means of the hook. The tube (14) with valve (20) is lead between the bottom of the back support and the seat of the front passenger. The bowl is placed on the front passenger seat and the drain quick connection coupling (12) is connected to the tube from the collecting bladder while the inlet quick connection coupling is connected to the tube (14) from the tank (22).

To use the device, the user places the bowl on the automobile seat then sits on it while it is positioned on the seat and both drain and inlet tubes are connected. For privacy the user may then wrap a large towel around him or herself from the waist to the knees. While the towel is in place the user may undo and redo the clothing to facilitate the urination. After urination the valve (20) is opened thus allowing flushing of bowl (10) by gravity flow of solution from tank (22). The valve is held open for about 5 seconds then released. The spring loaded valve recloses automatically once it is released. The urine and the flushing solution drains to the collecting disposable bladder (16) by gravity. The tubes are then disconnected from the bowl and the bowl is placed under a seat for storage.

To dispose of used bladder and contents, valve (17) is closed and the drain tube (19) is disconnected at connector (25) The bladder may then be taken away and the bladder detached at coupling (18) and disposed of.

From the foregoing description it was shown that this invention provides a simple, inexpensive, sanitary and discrete means of ridding oneself of urine while in an automobile, the device having only three major parts; a tank, a bowl, and a collecting bladder and simply connected by tubes and the liquid flow throughout is gravitational. The invention also showed advantages over prior art by its easiness to be fitted in any vehicle, used on any seat in a vehicle and its self containment.

Although the description above contains some specificities, these should not be construed as limiting the scope of the invention but as merely providing illustration of the embodiments of the invention. For example the bowl could have other shapes such round or rectangular, etc. The collecting container could be in other forms and not a bladder. The flushing solution could be pumped from a tank located elsewhere. The urine could be collected in a compartment in the bowl piece thus eliminating the collecting bladder.

What is claimed is:

1. A vehicular urinal for use within a vehicle comprising:

a) a portable bowl having an inside circumference and adapted to be positioned on a seat within the vehicle;

b) a portable container adapted to be hung inside of the vehicle at a location higher than said portable bowl and adapted to contain a flushing solution, wherein the flushing solution flows under gravity to said bowl through a valved conduit means;

c) a flushing solution ejecting device circumferentially mounted along said inside circumference of said bowl to eject said flushing solution in said bowl; and d) a disposable collecting bladder positioned below said bowl for collecting effluent that flows from said bowl under gravity flow through a second valved conduit means into said collecting bladder.

2. The urinal of claim 1 wherein each conduit means is connected to said bowl by quick connect coupling.

3. The urinal of claim 2 wherein said collecting bladder is capable of being isolated and disconnected from said portable bowl at said quick connect coupling for disposal.

\* \* \* \* \*